(12) United States Patent
Mann

(10) Patent No.: US 7,321,173 B2
(45) Date of Patent: Jan. 22, 2008

(54) WIND POWERED STREETLIGHT

(76) Inventor: Harjit Mann, 27 Wadhurst Road, Edgbaston Birmingham W. Midlands (GB) B17 8JF ( * ) Notice: Subject to any disclaimer, the term of this patent is extended or adjusted under 35 U.S.C. 154(b) by 59 days.

(21) Appl. No.: 11/347,927

(22) Filed: Feb. 6, 2006

(65) Prior Publication Data
US 2007/0182161 A1  Aug. 9, 2007

(51) Int. Cl.
*F03D 9/00* (2006.01)
*H02P 9/04* (2006.01)

(52) U.S. Cl. .......................... 290/55; 290/44

(58) Field of Classification Search .............. 290/55, 290/54, 44, 43; 416/111, 119, 132 B; 415/4.2, 415/4.5, 2.1, 7, 905, 906
See application file for complete search history.

(56) References Cited

U.S. PATENT DOCUMENTS

| | | | | |
|---|---|---|---|---|
| 3,877,836 A * | 4/1975 | Tompkins | .................. | 416/119 |
| 3,897,170 A * | 7/1975 | Darvishian | .................. | 416/119 |
| 4,200,904 A * | 4/1980 | Doan | .................. | 362/183 |
| 4,329,593 A * | 5/1982 | Willmouth | .................. | 290/44 |
| 4,364,709 A * | 12/1982 | Tornquist | .................. | 416/132 B |
| 4,419,587 A * | 12/1983 | Benton | .................. | 290/44 |
| 4,508,972 A * | 4/1985 | Willmouth | .................. | 290/55 |
| 5,997,252 A * | 12/1999 | Miller | .................. | 416/197 A |
| 6,661,113 B1 * | 12/2003 | Bonin | .................. | 290/55 |
| 2004/0047723 A1* | 3/2004 | Horjus | .................. | 415/4.2 |
| 2005/0263057 A1* | 12/2005 | Green | .................. | 114/102.1 |
| 2007/0115663 A1* | 5/2007 | Weiser et al. | .................. | 362/253 |

\* cited by examiner

*Primary Examiner*—Julio Gonzalez
(74) *Attorney, Agent, or Firm*—Raymond M. Galasso; Galasso & Associates LP

(57) ABSTRACT

A streetlight for illuminating a portion of an adjacent roadway. The streetlight includes three vertical support members with a rotatable axle mounted intermediate thereto. Superposed on the vertical support members is a light assembly. A plurality of wind receptacles, having a hub, at least one support arm and at least one cup shaped wind-capturing device are operatively connected to the axle. The wind receptacles act to harness air current and rotate the axle, which is operatively connected to an electrical generator. The electrical current from the generator is stored in a power storage unit. The streetlight further includes photovoltaic cells for supplying power to the light assembly.

6 Claims, 2 Drawing Sheets

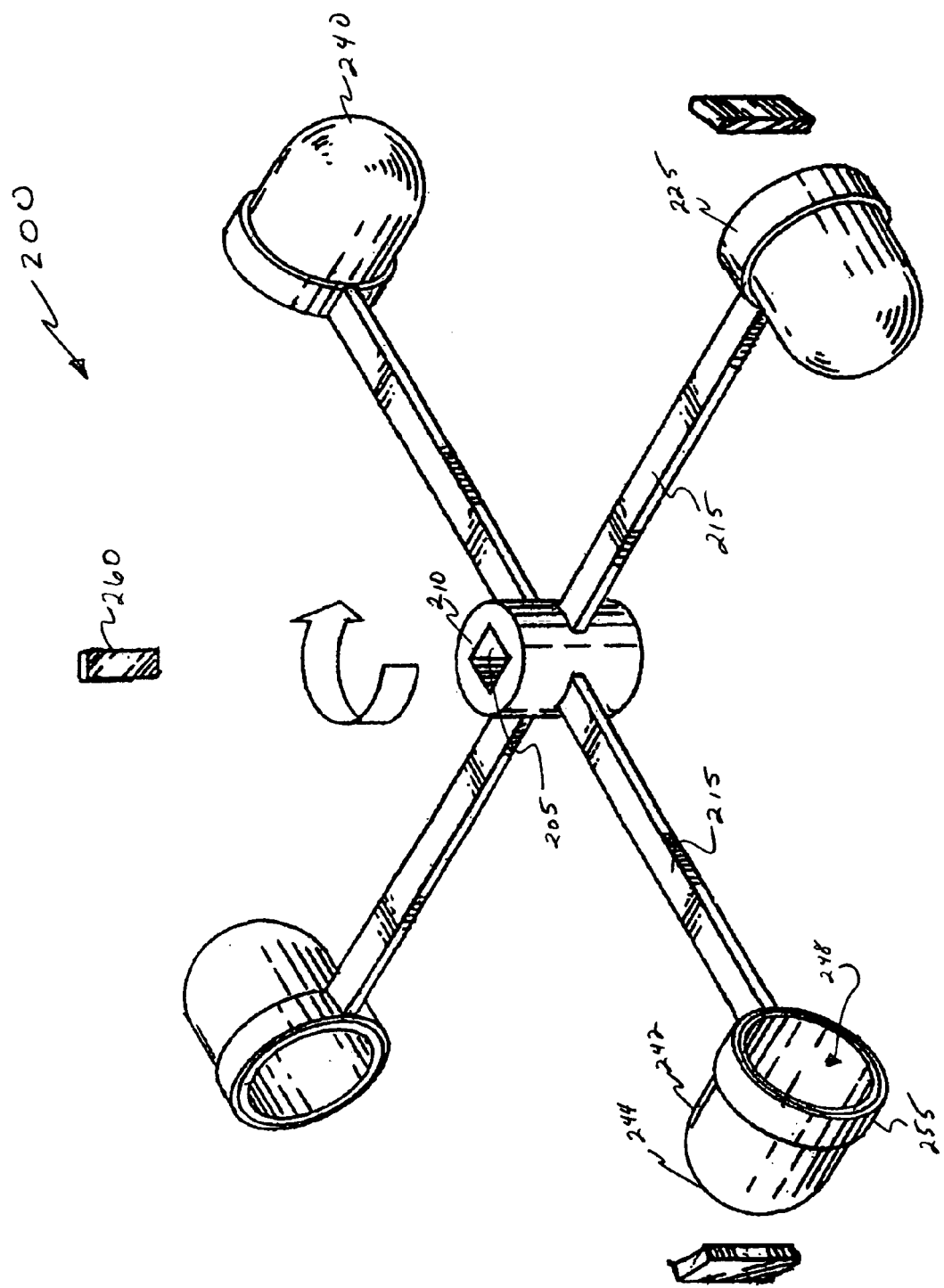

WIND POWERED STREETLIGHT

FIELD OF THE INVENTION

The present invention relates to a light powered by natural resources, more specifically but not by way of limitation, a light for illuminating a portion of a roadway that is powered by a series of wind receptacles and photovoltaic cells to facilitate the generation and storage of electrical energy required to illuminate the light.

BACKGROUND

People frequently travel at night by many methods on roads and highways. Government municipalities frequently provide lighting to illuminate a portion of the roads that are frequently traveled to increase the safety conditions of these areas. Traditional street lights are most often powered by the municipal's electrical system.

One problem with traditional powered streetlights is that they require a source of electricity. Electricity sources that are commonly used comprise of a municipal electrical grid that is used to power a certain geographical area. The streetlight must be wired into this grid in order to produce light. Most often, natural gas or coal is used to generate power for the electrical grids that power most urban areas. As energy commodities are in a state of high demand, conservation of the use of these commodities is preferred.

Traditional street lights are also limited to certain geographical areas due to their need for a presence an electrical grid to interface with in order to receive the electricity needed for operation. Rural areas often do not have the electrical infrastructure required to supply electricity to streetlights. Traditional streetlights are routinely not placed in rural areas as the installation costs are usually prohibitive as municipal electricity grids may not be available to supply power. Having the ability to place a streetlight in rural areas would facilitate an increase in safety conditions in these areas.

Accordingly, there is a need for a street light that does not required interfacing with an municipal electrical system and is capable of generating and storing electricity aided by several natural resource powered devices such as but not limited to wind powered and/or photovoltaic cells.

SUMMARY OF THE INVENTION

It is the object of the present invention to provide a street light for illuminating a portion of a street or highway that does not require the use of electricity from a municipal electrical grid.

It is a further object of the present invention to provide a street light that uses a combination of wind receptacles and photovoltaic cells to generate electricity necessary for the operation of the streetlight to provide illumination for a portion of a street or highway.

Yet another object of the present invention is to provide a streetlight that includes a device for storing electrical current that is generated by a natural power source such as but not limited to sunlight or wind.

A further object of the present invention is to provide a streetlight that promotes the conservation of energy commodities such as coal or natural gas.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 2 illustrates a detailed view of an embodiment of a wind receptacle of the present invention.

DETAILED DESCRIPTION

Figure 1:
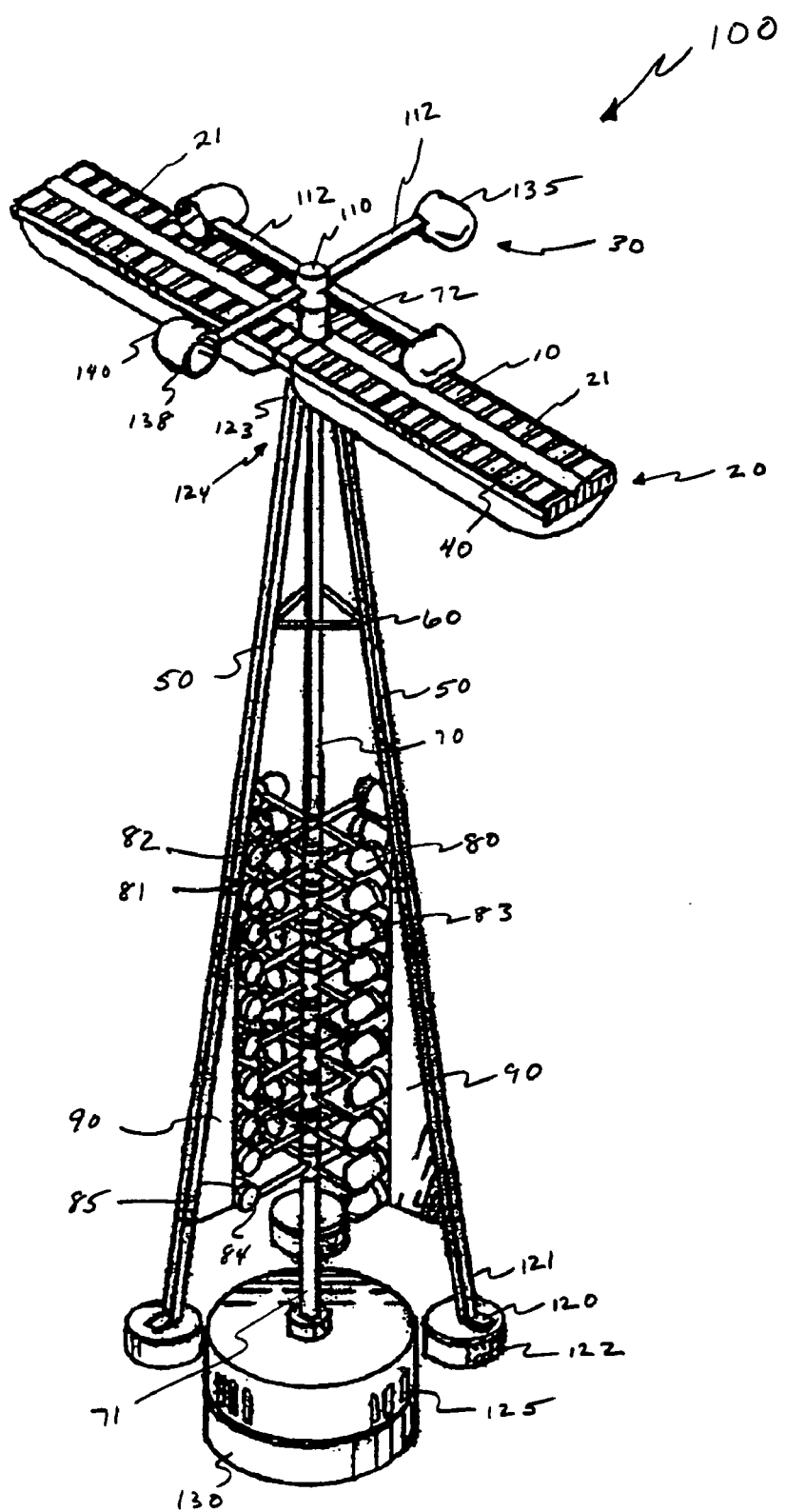
FIG. 1 illustrates a perspective view of an embodiment of the present invention.

Referring to the embodiments in FIGS. 1 and 2, wherein like elements are designated with identical reference numbers and wherein various elements are not necessarily drawn to scale. In particular, in FIG. 1 there is illustrated a streetlight 100 that is constructed according to the principles of the present invention.

The streetlight 100 comprises a plurality of vertical support members 50. The vertical support members 50 are configured in a tripod pattern with each vertical support member 50 being positioned angled outward from the center axle 70. The vertical support members 50 are configured to form the structural support for the streetlight. The vertical support members 50 are manufactured from conventional square metal tubing that are non-corrosive metal. Good results have been achieved using aluminum or galvanized steel. Although the vertical support members 50 are illustrated in the drawing submitted herewith as square tubes, it is further contemplated within the scope of the present invention that numerous different shapes and sizes of conventional metal tubing could be used in placed of and/or in conjunction with the square tubing illustrated and perform the desired function suggested herein. Furthermore, it is contemplated within the scope of the present invention that numerous different configurations and quantities of the vertical support members 50 are possible to achieve the desired functionality as suggested herein.

Each vertical support member 50 has a first end 121 and a second end 123. Each first end 121 is secured to a mounting bracket 120. The mounting bracket 120 is contiguous with and generally perpendicular to the vertical support member 50. The mounting bracket 120 is secured to the vertical support member 50 by traditional mechanical methods such as but not limited to welding. The mounting bracket 120 functions to secure the vertical support member 50 to the mounting base 122. Each vertical support member 50 is superposed on a mounting base 122 and secured with the mounting bracket 120. The mounting base 120 is manufactured from conventional durable material such as concrete.

The mounting base 122 functions to provide a stable horizontal support structure for the street light 100 upon positioning on a variety of terrains that are typical of roadside conditions. Distally positioned from the mounting base 122 underneath the light assembly 20 and intermediate each vertical support member 50 are a plurality of horizontal support members 60. The horizontal support members 60 are positioned in order to provide structural support for the vertical support members 50. The horizontal support members 60 are fastened to the vertical support member 50 by conventional mechanical or other suitable methods such as but not limited to welding.

Although the drawings submitted herewith illustrate three horizontal support members 60, it is further contemplated within the scope of the present invention that numerous configurations and quantities of the horizontal support members 60 could be used in place of and/or in conjunction with the horizontal support members 60 illustrated to provide the functionality as suggested herein.

The second ends 123 of each vertical support member 50 are fastened together near the apex 124 by suitable methods such as welding. The vertical support members 50 are fastened near the apex 124 with sufficient space therebetween for the center axle 70 to extend upwardly through and permit rotation thereof.

Superposed to the second ends 123 of the vertical support members 50 and generally perpendicular thereto is the light assembly 20. The light assembly 20 is comprised of two generally equal portions 21. Each portion 21 of the light assembly 20 extends opposite each other and outward from the vertical support members 50. The light assembly 20 is fastened to the vertical support members 50 with conventional mechanical fasteners such but not limited to bolts.

The light assembly 20 further comprises a plurality of photovoltaic cells 10. The photovoltaic cells 10 are conventional photovoltaic cells that convert light energy into electrical current. The electrical current generated from the photovoltaic cells 10 is transmitted to a power storage unit 130. The electrical transmission is delivered by insulated copper wiring. The photovoltaic cells 10 superposed on each portion 21 are secured by a fastener 40. The fastener 40 is a suitable rigid material that is flat and extends substantially across the length of the portion 21. The fastener 40 is manufactured from non-corrosive metal and is secured to the light assembly 20 by conventional mechanical methods such as but not limited too screws.

A center axle 70 is present having a first end 71 and a second end 72. The second end 72 of the center axle 70 upwardly projects through the light assembly 20. The center axle 70 is a suitable rigid material such as but not limited to a non-corrosive metal. The center axle 70 extends from above the light assembly 20 downward to operatively connect with the electrical generator 125. The center axle 70 is mounted intermediate the vertical support members 50 and is mounted so as to allow complete rotation thereof. Mechanically fastened to the second end 72 of the axle 70 is a hub 110. The hub 110 is rotatably mounted to the second end 72 of the center axle 70. The hub 110 is secured to the second end 72 of the center axle 70 by suitable mechanical methods such as but not limited to bolts.

Extending outward from the hub 110 and generally perpendicular thereto is a plurality of support arms 112. The support arms 110 are flat bars manufactured of a suitable rigid, non-corrosive material such as aluminum. Contiguous with the end of the support arms 110 distally positioned from the hub 110 are the wind capturing devices 135.

The wind capturing devices 135 comprise a wall 138 and a bottom 140. The wall 138 and the bottom 140 are integrally formed to create a substantially hollow compartment with an opening. The wall 138 and bottom 140 are manufactured from a suitable moldable material such as but not limited to thermoplastic. The wind capture devices 135 are generally cup shaped with the bottom 140 being contiguous with the wall 138 and convex thereto. The wind capturing devices 135 functions to temporarily retain available air currents from passing automobile traffic or weather conditions and move the primary wind receptacle 30 in a clockwise direction.

As the primary wind receptacle 30 rotates the center axle 70 will rotate in a clockwise direction. Although the wind capturing devices 135 are illustrated being configured in a cup shape with a convex bottom, it is further contemplated within the scope of the present invention that the wind capturing devices 135 could be manufactured in numerous different shapes and sizes in place of and/or in conjunction with the wind capturing devices 135 as illustrated herein.

Movement of the primary wind receptacle 30 causes the center axle 70 that is operatively connected thereto via the hub 110 to rotate. As the primary wind receptacle 30 rotates the center axle 70 the first end 71 of the center axle 70 activates the electrical generator 125. The electrical generator 125 is a conventional alternator that generates an electrical current. The current generated from the electrical generator 125 is transmitted via insulated copper wiring to the power storage unit 130. The power storage unit 130 receives electrical current from the electrical generator 130 and the photovoltaic cells 10 as described herein. The power storage unit 130 is connected to the light assembly with insulated copper wire or other suitable electrical wire. The electrical current stored in the power storage unit 130 is used to illuminate the light assembly 20 for a desired period of time. It is further contemplated within the scope of the present invention that intermediate the power storage unit 130 and the light assembly 20 is a light sensitive switch. The switch would act to close the electrical circuit between the power storage unit 130 and the light assembly 20 during the nighttime hours and activate illumination of the light assembly 20. Alternatively, a conventional timer could be used to activate the illumination of the light assembly 20.

Interposed the apex 124 and the electrical generator 125 rotatably mounted to the center axle 70 are a plurality of secondary wind receptacles 80. The secondary wind receptacles 80 are constructed similar to the primary wind receptacle as described herein. The secondary wind receptacles 80 comprise a hub 81, a plurality of support arms 82, and a cup-shaped wind-capturing device 83. Circumferentially disposed thereon the wind-capturing device 83 of the secondary wind receptacles 80 proximate to the opening 84 is a magnetic ring 85. The magnetic ring 85 functions to assist the secondary wind generators 80 clockwise rotation and subsequent rotation of the center axle 70. As the secondary wind receptacles 80 rotate as a result of air movement, the magnetic ring 85 interacts with the magnetized panels 90 secured to the vertical support members 90. The magnetized panels 90 are magnetic polar opposites of the magnetic ring 85. As the secondary wind receptacle 80 is rotated about the center axle 70 from air currents, provided by passing automobile traffic or weather conditions, the magnetic ring 85 acts to increase the rotational speed by repelling the temporarily adjacent magnetic ring 85. Increasing the rotational speed of the secondary wind receptacles 80 facilitates the generation of more electrical current produced from the electrical generator 125 that is operatively connected to the first end 71 of the center axle 70. Although a plurality of secondary wind receptacles 80 are shown in the drawings submitted herewith, it if further contemplated that different quantities and shapes of secondary wind receptacles 80 could be used in place of and/or in conjunction with the secondary wind receptacles 80 as described herein. It is further contemplated to be within the scope of this invention that the spacing of each of the secondary wind receptacles 80 with respect to each other can be equally proportioned such that maximum performance is obtained.

The electrical generator 125 is superposed to the power storage unit 130. It is contemplated within the scope of the present invention that the electrical generator 125 and the power storage unit 130 can be mounted beneath the terrain upon which the streetlight 100 has been installed or be secured above ground. It is further contemplated within the scope of the present invention that the power storage unit 130 has sufficient capacity to provide electrical current to illuminate the light assembly 20 as needed for typical demands for operating the street light 100 throughout extended periods of darkness.

Now referring in particular to FIG. 2, a detailed view of a secondary wind receptacle 200 is illustrated. The secondary wind receptacle 200 consists of a hub 210 that is generally cylindrical in shape. The hub 210 is manufactured from a suitable rigid, non-corrosive material such as aluminum. Centrally positioned in the hub 210 and extending the entire length thereof, is an axle aperture 205. The axle aperture 205 is of suitable shape to interconnect with the center axle 70, illustrated in FIG. 1. Although the axle aperture 205 is illustrated as being square in shape, it is contemplated within the scope of the present invention that the axle aperture 205 could consist of numerous different shapes to correspond with the shape of material used to construct the axle 70. Contiguous with the hub 210 and extending outward there from are a plurality of support arms 215. The support arms 215 are flat rectangular shaped bars that are manufactured from a suitable rigid material such as but not limited to aluminum. Integrally formed with the support arms 215 distally positioned from the hub 210 is a magnetic ring 225. The magnetic ring 225 is manufactured from a magnetized metal. The magnetic ring 225 is circumferentially disposed around the wind-capturing device 240 proximate to the opening. The wind-capturing device 240 is secured to the magnetic ring 225 by suitable chemical or mechanical methods. Magnets 260 are secured to support members 90 and operate as described herein above. The wind-capturing device 240 comprises a wall 242 and a bottom 244 to form a substantially hollow container 248 with an opening. The container 248 is generally cup shaped with a convex bottom in order to efficiently capture any ambient air currents. Although the wind capturing devices 240 are illustrated as being cup-shaped with a convex bottom, it is contemplated within the scope of the present invention that the wind capturing devices could be numerous different shapes and sizes and achieve the functionality as suggested herein. It is further contemplated within the scope of the present invention that different quantities of wind capturing devices 240 could be used and achieve the desired functionality of the secondary wind receptacle 200 as suggested herein.

Referring in particular to FIG. 1, a description of the operation of the streetlight 100 is as follows. The mounting bases 122 are prepared in a location where the streetlight 100 is desired. Although it is desirable to position the streetlight 100 adjacent to a highway or street, it is contemplated that the streetlight 100 could be utilized anywhere illumination is desired. Furthermore, scaled-down embodiments could be utilized for areas such as but not limited to sidewalks. Once the mounting bases 122 are prepared, the streetlight 100 is superposed on the mounting bases 122. Requisite operable connections from the center axle 70 to the electrical generator 125 are completed along with the necessary wiring connections as described herein.

Once the complete streetlight 100 is in place the photovoltaic cells 10 capture the available sunlight and convert the sunlight into electrical current whereby it is then transferred via an insulated copper wire to the power storage unit 130. Additionally, any available wind current is captured by the primary wind receptacle 30 and the secondary wind receptacles 80. The captured air currents rotate the primary wind receptacle 30 and the secondary wind receptacles 40 causing the center axle 70 which is operatively connected thereto to rotate. The center axle 70 is interconnected with the electrical generator 125. The rotating center axle 70 activates the electrical generator 125 and produces an electrical current. The current is transferred from the electrical generator 125 to the power storage unit 130 via insulated copper wire to be stored for use in illuminating the light assembly 20. The light assembly 20 is illuminated by an automated timer or a light sensitive switch to illuminate during hours of darkness with electrical current from the power storage unit 130.

In the preceding detailed description, reference has been made to the accompanying drawings that form a part hereof, and in which are shown by way of illustration specific embodiments in which the present invention may be practiced. These embodiments, and certain variants thereof, have been described in sufficient detail for those skilled in the art to practice the present invention. It is to be understood that other suitable embodiments may be utilized and that logical changes may be made without departing from the spirit or scope of the present invention. The description may omit certain information known to those skilled in the art. The preceding detailed description, is therefore, not intended to be limited to the specific forms set forth herein, but on the contrary it is intended to cover such alternatives, modifications, and equivalents as can be reasonably included within the spirit and scope of the appended claims.

What is claimed is:

1. A light fixture for illuminating a portion of an adjacent roadway comprising:

at least three vertical support members, said vertical support members configured in a tripod pattern, said vertical support members having a first end and a second end, said first end of said vertical support members superposed on mounting bases, said mounting bases configured to provide horizontal structural support;

an axle, said axle being intermediate said vertical support members, said axle having a first end and a second end, said axle being rotatable;

a light assembly, said light assembly for illuminating a portion of said roadway, said light assembly superposed on said second end of said vertical support members, said light assembly having two portions, said portions being perpendicular to said vertical support members, said portions oppositely extending outward from said vertical support members;

a primary wind receptacle, said primary wind receptacle operatively connected to said second end of said axle, said primary wind receptacle for harnessing air currents, said primary wind receptacle being configured to rotate said axle, said primary wind receptacle further including a hub, said hub surroundably mounted to said second end of said axle, four arms, said arms contiguous with said hub, said arms being perpendicular to said hub, four wind capturing devices, said wind capturing devices mounted to said arms distal to said hub, said wind capturing devices being configured to be cup-shaped, said wind capturing devices having a convex shaped bottom;

a plurality of secondary wind receptacles, said secondary wind receptacles being operatively connected to said axle, said secondary wind receptacles intermediate said light assembly and said mounting bases, said secondary wind receptacles for harnessing air currents;

a power supply, said power supply operatively connected to said first end of said axle, said power supply being configured to generate electrical current.

2. The light fixture as recited in claim 1, wherein said secondary wind receptacles further include four cup-shaped wind capturing devices, said wind capturing device having circumferentially disposed thereon a magnetized ring.

3. The light fixture as recited in claim 2, and further including three magnetized panels, said panels mounted on said vertical support members, said magnetized panels having the opposite magnetic pole from said magnetized ring.

4. The light fixture as recited in claim 3, and further including a power storage unit, said power storage unit for receiving electrical currents from said power supply, said power storage unit for providing electrical current to said light assembly.

5. The light fixture as recited in claim 4, and further including three horizontal support members, said horizontal support members intermediate said vertical support members, said horizontal support members being interposed said light assembly and said mounting base.

6. The light fixture as recited in claim 5, wherein said power supply is an alternator.

* * * * *